(12) United States Patent
Roychoudhury et al.

(10) Patent No.: US 11,973,249 B2
(45) Date of Patent: Apr. 30, 2024

(54) INTEGRATED POWER GENERATION SYSTEM

(71) Applicant: PRECISION COMBUSTION, INC., North Haven, CT (US)

(72) Inventors: Subir Roychoudhury, Madison, CT (US); Timothy LaBreche, Woodbridge, CT (US); Saurabh Vilekar, Woodbridge, CT (US); Chunming Qi, Hopkinron, MA (US)

(73) Assignee: PRECISION COMBUSTION, INC, North Haven, CT (US)

( * ) Notice: Subject to any disclaimer, the term of this patent is extended or adjusted under 35 U.S.C. 154(b) by 414 days.

(21) Appl. No.: 17/285,542

(22) PCT Filed: Nov. 4, 2019

(86) PCT No.: PCT/US2019/059586
§ 371 (c)(1),
(2) Date: Apr. 15, 2021

(87) PCT Pub. No.: WO2020/101929
PCT Pub. Date: May 22, 2020

(65) Prior Publication Data
US 2021/0384537 A1    Dec. 9, 2021

Related U.S. Application Data

(60) Provisional application No. 62/760,979, filed on Nov. 14, 2018.

(51) Int. Cl.
*H01M 8/04111* (2016.01)
*H01M 8/04014* (2016.01)
(Continued)

(52) U.S. Cl.
CPC ..... *H01M 8/0618* (2013.01); *H01M 8/04022* (2013.01); *H01M 8/04111* (2013.01); *H01M 8/04156* (2013.01); *H01M 2008/1293* (2013.01)

(58) Field of Classification Search
None
See application file for complete search history.

(56) References Cited

U.S. PATENT DOCUMENTS 4,820,594 A * 4/1989 Sugita ................. H01M 8/0612
429/429
5,051,241 A    9/1991 Pfefferle
(Continued)

FOREIGN PATENT DOCUMENTS

FR    2904476 A1    2/2008

OTHER PUBLICATIONS

Wee, Jung-ho, "Molten Carbonate fuel cell and gas turbine hybrid systems as distributed energy resources" (2011) (Year: 2011).*
(Continued)

*Primary Examiner* — Gerald L Sung
(74) *Attorney, Agent, or Firm* — Marie Zuckerman; Andrew D. Garry

(57) ABSTRACT

An integrated power generation system including: a hotbox containing a steam reformer and at least one solid oxide fuel cell (SOFC) stack; a condenser, a combustor, a heater, and a turbomachine comprising a compressor and an expander. The steam reformer is configured to convert a hydrocarbon fuel and steam into a stack fuel. The SOFC stack is configured to convert the stack fuel into a first anode waste gas. The condenser functions to remove water from the first anode waste gas, thereby producing a second anode waste gas of higher fuel energy density. The combustor burns the second anode waste gas with release of exothermic heat. The (Continued)

heater thermally transmits heat from an expanded combustion product to water collected in the condenser, so as to generate steam. A steam line fluidly connects the heater to the steam reformer.

22 Claims, 3 Drawing Sheets

(51) Int. Cl.
*H01M 8/04119* (2016.01)
*H01M 8/0612* (2016.01)
*H01M 8/12* (2016.01)

(56) References Cited

U.S. PATENT DOCUMENTS

| | | | |
|---|---|---|---|
| 5,482,791 A * | 1/1996 | Shingai | H01M 8/0612 429/429 |
| 6,156,444 A | 12/2000 | Smith | |
| 6,328,936 B1 | 12/2001 | Roychoudhury | |
| 6,746,657 B2 | 6/2004 | Castaldi | |
| 7,141,092 B1 | 11/2006 | Roychoudhury | |
| 7,504,047 B2 | 3/2009 | Castaldi | |
| 9,059,440 B2 | 6/2015 | Hotto | |
| 10,411,281 B1 | 9/2019 | Vilekar | |
| 2004/0031388 A1 * | 2/2004 | Hsu | F02G 1/043 95/143 |
| 2005/0106429 A1 | 5/2005 | Keefer | |
| 2006/0010866 A1 * | 1/2006 | Rehg | H01M 8/0618 429/434 |
| 2008/0118800 A1 | 5/2008 | Devriendt | |
| 2017/0260902 A1 | 9/2017 | Nakamoto | |
| 2018/0212261 A1 | 7/2018 | Manabe | |
| 2019/0229352 A1 * | 7/2019 | Junaedi | H01M 8/2425 |
| 2023/0030209 A1 * | 2/2023 | Martelli | H01M 8/04097 |

OTHER PUBLICATIONS

Co-Pending unpublished U.S. Appl. No. 16/893,850, filed Jun. 5, 2020, entitled "Thermal Management of a Solid Oxide Fuel Cell System"; Inventors: Saurabh Vilekar, Christian Junaedi, Eric Allocco, Christopher Howard.

Co-Pending unpublished U.S. Appl. No. 16/672,663, filed Nov. 4, 2019, entitled "Thermally Integrated HotBox Combining a Steam Reformer with SOFC Stacks"; Inventors: Subir Roychoudhury, Saurabh Vilekar, Timothy LaBreche, Francesco Macri.

* cited by examiner

INTEGRATED POWER GENERATION SYSTEM

CROSS REFERENCE TO RELATED APPLICATIONS

This application is a 371 of International patent application PCT/US2019/059586, filed Nov. 4, 2019, which claims benefit of U.S. provisional patent application No. 62/760,979, filed Nov. 14, 2018, incorporated herein by reference.

FIELD OF THE INVENTION

This invention pertains to a power generation system.

BACKGROUND OF THE INVENTION

A need exists in the art for an improved power generation system for distributed energy markets. As intended for this invention, the power generation system includes at least a combustor, a turbomachine, and a solid oxide fuel cell hotbox comprising a housing within which are disposed a steam reformer and at least one solid oxide fuel cell (SOFC) stack.

As background review, the steam reformer functions to convert a mixture of hydrocarbon fuel and steam in an endothermic process into a partially oxidized reformate comprising hydrogen and carbon monoxide, which is useful as a stack fuel. The SOFC stack is constructed of a plurality of SOFC repeat units, each repeat unit comprising a fuel electrode (anode), a solid oxide electrolyte, and an oxidant electrode (cathode). Each SOFC repeat unit directly converts the stack fuel, i.e., the hydrogen and carbon monoxide, with an oxidant, such as air or oxygen, via an electrochemical process into stack products, namely, water and carbon dioxide, respectively, while producing a useful DC electrical current. As may be desired, a conventional inverter is employed to convert the DC current into an AC current. The electrochemical process is highly exothermic; thus each SOFC stack produces considerable waste heat, which is beneficially recuperated and utilized.

The combustor burns a fuel, for example, a hydrocarbon fuel such as methane, in the presence of excess oxidant, e.g., air, to deep oxidation products consisting essentially of carbon dioxide and water with release of exothermic heat. Typically, the combustor is conjoined in a larger turbomachine that includes a compressor connected to an expander. The heated combustion products obtained from the combustor are subjected to expansion in the expander, thereby driving the turbomachine and converting heat into mechanical energy, which may be converted into electrical energy via a generator as known in the art.

Desirably, an improved power generation system should achieve an overall system efficiency of greater than about 70 percent electrical. To reach this goal, the SOFC stacks require operation at about optimum or higher than optimum chemical to electric efficiency. Moreover, reaching this goal requires an efficient turbomachine and tight thermal integration of all system components. Accordingly, various problems need to be addressed.

First, an elevated operating pressure might be desirable in facilitating a higher chemical to electric conversion efficiency. Still, conventional SOFC stacks typically cannot survive elevated pressures, because seals and ceramic cells tend towards damage and failure as pressure differentials increase. Second, to maximize thermal efficiency, the SOFC stacks are likely to operate at an upper end of the operable temperature range, specifically, between about 600° C. to 900° C. SOFC stacks designed with conventional metal interconnects tend towards material degradation at these higher operating temperatures. Additionally, the SOFC stacks should be durable, so as to offer consistent payback over a projected twenty-year period of use.

Third, the turbomachine should be stable over a wide control window to protect the SOFC stacks under transients. Present day turbomachinery often exhibit flow reversal resulting in ingestion of combustion products into the SOFC stacks with catastrophic damage.

Fourth, the steam reformer should achieve high fuel conversion and efficiency as well as providing durability. As a fifth challenge, the SOFC hotbox containing the steam reformer and the SOFC stack(s) should be tightly thermally integrated with the combustor and turbomachine components so as to utilize optimally all derived exothermic heat while minimizing heat losses to the environment.

SUMMARY OF THE INVENTION

This invention provides for an improved power generation system and process of operating same. Improvements are directed particularly towards enhanced steam reformer and combustor efficiencies and enhanced thermal integration of the SOFC hotbox with the combustor and the turbomachine. Accordingly, the power generation system of this invention comprises:
(a) a solid oxide fuel cell hotbox comprising a steam reformer configured to produce under reforming conditions a stack fuel, and further comprising at least one solid oxide fuel cell stack configured to convert the stack fuel into a first anode waste gas comprising water;
(b) a condenser configured to receive the first anode waste gas and condense at least a fraction of the water therefrom, so as to produce a second anode waste gas of reduced water content;
(c) a combustor configured to receive from the condenser the second anode waste gas of reduced water content and further configured to combust same to form a combustion product;
(d) a turbomachine comprising an expander configured to expand the combustion product and pass said expanded combustion product to an expanded combustion product line;
(e) a heater comprising a cold side pathway and a hot side pathway, the cold and hot side pathways being in thermally conductive contact; the heater configured to receive into the cold side pathway water from the condenser, and further configured to receive into the hot side pathway said expanded combustion product from the expanded combustion product line; and
(f) a steam line in fluid communication with both the cold side pathway of the heater and with the fuel reformer.

In a related aspect, this invention provides for a process of operating a power generation system comprising:
(a) in a steam reformer, contacting a hydrocarbon fuel and steam in a catalytic reforming zone under process conditions sufficient to produce a stack fuel comprising hydrogen and carbon monoxide;
(b) feeding the stack fuel into an anode side of a solid oxide fuel cell stack and feeding an oxidant into a cathode side of the solid oxide fuel cell stack, under conditions sufficient to produce a first anode waste gas and a cathode waste gas;

(c) feeding the first anode waste gas into a condenser so as to produce a water stream and a second anode waste gas of reduced water content;

(d) feeding the second anode waste gas and at least a portion of the cathode waste gas into a combustor wherein combustion occurs to produce a combustion product;

(e) feeding the combustion product into a turbomachine expander, so as to produce an expanded combustion product;

(f) feeding the expanded combustion product into a hot side of a heater and feeding the water stream from the condenser into a cold side of the heater so as to produce steam;

(g) feeding the steam so produced into the steam reformer.

The system apparatus and process of this invention provide for a power generation system of improved overall electric efficiency through recuperation of SOFC stack and combustor waste heat and through reduced losses of waste heat to the environment. One enabler of this invention is its thermal integration of a unique steam reformer with the SOFC stack(s). Another enabler of this invention is its design for cycling the anode waste gas stream to the combustor, as opposed to prior art recycling of the anode waste gas stream to the steam reformer. Yet another enabler of this invention is incorporation of a condenser between the anode side of the SOFC stack(s) and the combustor, such that the first anode waste gas stream is passed to the condenser where at least a fraction of the water is removed, thereby resulting in a second anode waste gas stream of higher fuel energy density and reduced water content. This second anode waste gas stream and at least a portion of the cathode waste gas are then passed into the combustor where combustion occurs with release of exothermic heat. The water stream obtained from the condenser is converted to steam or superheated steam in a heater that obtains its heat via recuperation of stack heat and the exotherm from the combustor. Water has a higher heat capacity than air. By moving the heat into the water or into a low temperature steam feed, the heater and any other heat exchangers are kept at a more compact and efficient size, as compared with prior art systems. Moreover, the waste heat is then used efficiently to create a hotter steam for the endothermic reforming process, as opposed to prior art that uses essentially all of such heat to make a hotter cathode air for the already exothermic fuel cell process.

DRAWINGS

DETAILED DESCRIPTION OF THE INVENTION

Figure 1:
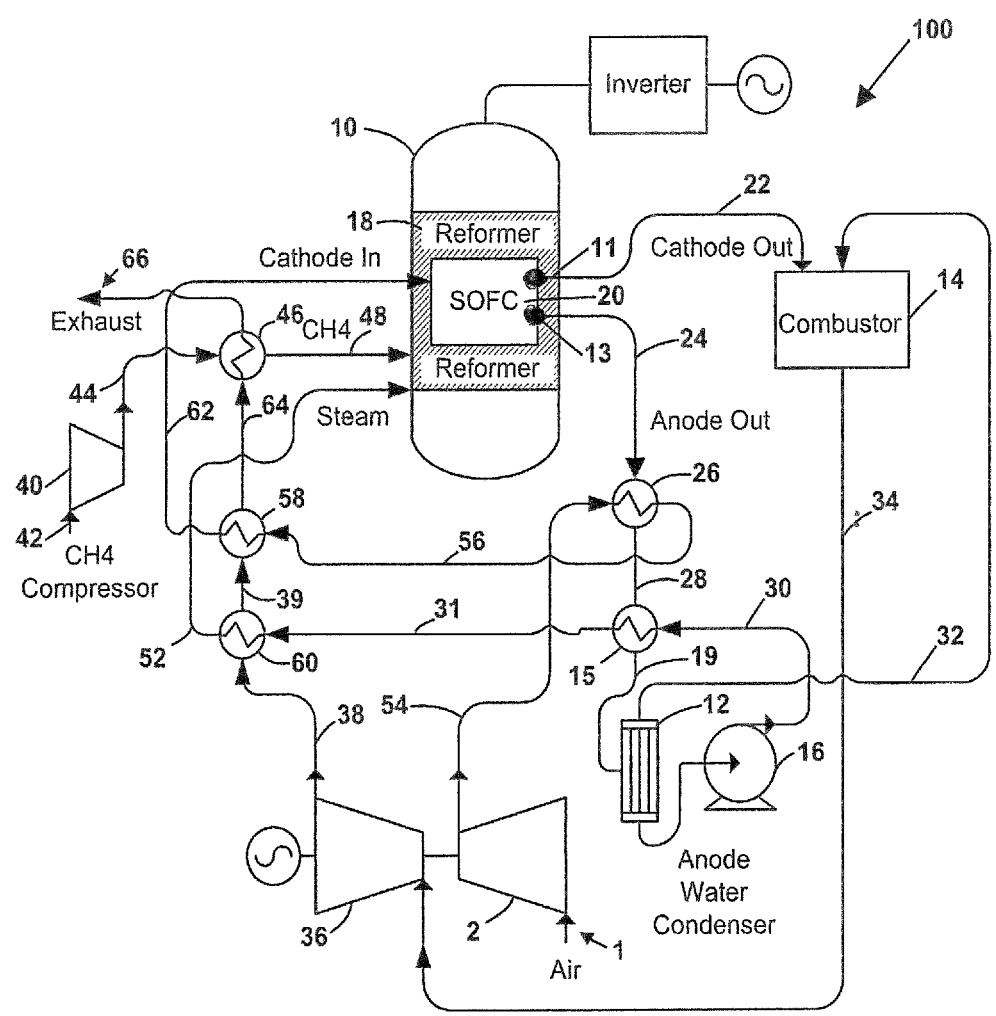
FIG. 1 depicts a schematic diagram of an embodiment of the integrated power generation system of this invention and its operating process.

As noted hereinabove, this invention is drawn towards an improved thermally integrated power generation system, which advantageously provides for enhanced steam reformer efficiency and enhanced thermal integration of the SOFC hotbox with the combustor and the turbomachine. In one illustrative embodiment, the power generation system of this invention comprises:

(a) a solid oxide fuel cell hotbox comprising (a) a steam reformer comprising a fuel inlet, a steam inlet, and a catalytic reforming zone having disposed therein a substrate having a reforming catalyst supported thereon, configured to produce under reforming conditions a stack fuel; and (b) at least one solid oxide fuel cell stack configured to convert the stack fuel into a first anode waste gas comprising water and unconverted stack fuel;

(b) a condenser configured to receive the first anode waste gas and condense at least a fraction of the water therefrom, so as to produce a water stream and a second anode waste gas comprising unconverted stack fuel having a reduced water content;

(c) a combustor configured to receive from the condenser the second anode waste gas and combust same to form a combustion product;

(d) a turbomachine comprising an expander configured to expand the combustion product and pass said expanded combustion product to an expanded combustion product line;

(e) a heater comprising a cold side pathway and a hot side pathway, the cold and hot side pathways being in thermally conductive contact; the heater configured to receive into the cold side pathway the water stream obtained from the condenser, and further configured to receive into the hot side pathway said expanded combustion product from the expanded combustion product line; and (f) a steam line in fluid communication with both the cold side pathway of the heater and with the fuel reformer.

As used herein, the term "turbomachine" defines a compressor connected, for example via a shaft or gear, to an expander. The turbomachine of this invention is not required to comprise a combustor; and in a preferred embodiment the turbomachine does not include a dedicated combustor.

The skilled person will appreciate that the heater and each heat exchanger described hereinafter is constructed with a hot-side pathway and a cold-side pathway that are independent of each other but are disposed in thermally conductive contact through a common heat conductive wall. Each pathway comprises an inlet and an outlet and the pathway for transporting a fluid (liquid or gas) from the inlet to the outlet. Heat is transferred across the thermally conductive common wall from a hot incoming stream to a comparatively cooler incoming stream, each passing through their respective hot- and cold-side pathways.

Accordingly, in another embodiment the integrated power generation system of this invention further comprises a cathode air preheat exchanger, configured such that a hot side of said cathode air preheat exchanger is fluidly connected to the expanded combustion product line and such that a cold side of said cathode air preheat exchanger is fluidly connected to a cathode oxidant (or air) line.

In yet another embodiment, the integrated power generation system of this invention further comprises a fuel preheat exchanger, configured such that a hot side of said fuel preheat exchanger is fluidly connected to the expanded combustion product line and such that a cold side of said fuel preheat exchanger is fluidly connected to a reformer fuel line.

In yet another embodiment, the integrated power generation system of this invention further comprises a multi-line heater, configured such that a hot side of said multi-line heater is fluidly connected to the expanded combustion product line and such that a cold side of said multi-line heater is fluidly connected individually to each of a water/steam line, a reformer fuel line, and a cathode oxidant (or air) line.

In one advantageous embodiment, the steam reformer employed in this invention comprises a steam reforming zone having disposed therein a mesh substrate having supported thereon a steam reforming catalyst. The mesh substrate, in particular, provides for high throughput, low pressure drop, improved reforming efficiency, improved selectivity to desired hydrogen and carbon monoxide products, and long term durability in the steam reforming process.

In another advantageous embodiment, the combustor employed in this invention is a stand-alone combustor not associated with the turbomachine. This combustor allows for the turbomachine of this invention to rely essentially solely on components of a compressor and an expander without a need for an additional combustor integrated therewith. In one specific embodiment, this stand-alone combustor comprises a mesh substrate having supported thereon a combustion catalyst, which provides for a flameless catalytic combustion of improved efficiency.

With reference to FIG. 1, a schematic is depicted of an embodiment 100 of the thermally integrated power generation system of this invention. As seen in FIG. 1, a hotbox 10 houses a steam reformer 18 and at least one SOFC stack 20. The spatial and thermal relationships of the steam reformer 18 to the at least one SOFC stack 20 are not illustrated in FIG. 1. Any conventional arrangement of these components is acceptable as known in the art. A hydrocarbon fuel inlet line 42 fluidly connects to a fuel compressor 40, from which compressed hydrocarbon fuel line 44 exits. The compressed hydrocarbon fuel line 44 passes into a reformer fuel preheat exchanger 46 from which hot compressed fuel line 48 exits and fluidly connects to the steam reformer 18. A steam inlet line 52 also connects to the steam reformer 18. A reformate output line (not shown) connects the steam reformer 18 with the anode (fuel electrode) side 13 of the SOFC stack 20.

Further to FIG. 1, air (oxidant) line 1 is connected to a turbomachine compressor 2, which fluidly connects with output compressed air (oxidant) line 54, the latter also fluidly connecting to a cool side of air preheat exchanger 26. From thence, preheated compressed air line 56 is connected to a cool side of cathode air preheater 58. A preheated compressed air line 62 exits from the cathode air preheater 58, fluidly connecting to a cathode (oxidant electrode) side 11 of the SOFC stack 20. The SOFC stack 20 is fluidly connected on its anode side output to a first anode waste gas exhaust line 24 and on its cathode side output to a cathode air waste gas exhaust line 22. The first anode waste gas exhaust line 24 fluidly connects to a hot side of air preheat exchanger 26, which by means of cool anode waste gas line 28 is fluidly connected to a hot side of water preheat exchanger 15. A cooler first anode waste gas line 19 fluidly connects the water preheat exchanger 15 with the condenser 12. A second anode waste gas line 32 fluidly connects the condenser 12 to combustor 14. Condenser 12 is also connected to water pump 16 and from thence via water line 30 to a cool side of water preheat exchanger 15. Water/steam line 31 connects the water preheat exchanger 15 to a cool side of heater 60. Steam line 52 fluidly connects the cool side of heater 60 to the steam reformer 18.

Further to FIG. 1, the cathode exhaust line 22 fluidly connects the SOFC 20 with the combustor 14. The second anode waste gas line 32 is fluidly connected to the combustor 14. The combustor 14 fluidly connects via combustion product line 34 to a turbomachine expander 36. Expanded combustion product line 38 leading from the expander 36 connects with a hot side of heater 60. A cool combustion product line 39 connects the output of the hot side of the heater 60 with a cathode air preheat exchanger 58. Cooler combustion product line 64 fluidly connects the exit of the hot side of cathode air preheat exchanger 58 to a hot side of fuel preheat exchanger 46, with a line finally exiting the system as combustion exhaust line 66 to the environment.

In terms of process as illustrated in FIG. 1, a hydrocarbon fuel (e.g., gaseous fuel, such as, methane) is fed from fuel line 42 through the compressor 40, exiting as a compressed fuel in fuel line 44. The compressed fuel passes through the cool side of the fuel preheat exchanger 46 exiting as a preheated fuel, which is fed via fuel inlet line 48 to the steam reformer 18 disposed within the hotbox 10. Steam line 52 inputs steam into the steam reformer 18. The steam reformer converts the hydrocarbon fuel and the steam in an endothermic reforming process into a stack fuel comprising hydrogen and carbon monoxide ($H_2$+CO). The stack fuel is fed to the anode (fuel electrode) 13 of the solid oxide fuel cell stack 20. An oxidant, such as air or oxygen, is fed from oxidant feed line 1 into compressor 2, from which a compressed oxidant exits via line 54. The compressed oxidant in oxidant line 54 passes through the cool side of the oxidant (air) preheat exchanger 26. A pre-heated compressed oxidant exits the air preheat exchanger 26 via preheated oxidant line 56 and is fed to the cool side of the cathode air preheat exchanger 58; from thence via preheated cathode air (oxidant) line 62 to the cathode (oxidant electrode) 11 of the SOFC stack 20. The fuel cell stack 20 converts the stack fuel ($H_2$+CO) and the oxidant in an exothermic electrochemical process into water and carbon dioxide and a useful DC electrical current. A cathode exhaust gas comprising unconverted oxidant exits the SOFC stack 20 via cathode waste gas line 22, from which the waste gas is fed into the combustor 14. A first anode waste gas comprising unconverted hydrogen and carbon monoxide as well as electrochemical products ($H_2O$+ $CO_2$) exits the SOFC stack 20 via first anode waste gas exhaust line 24, passing through the hot side of air preheat exchanger 26 and fluidly inputting a cool first anode waste gas via line 28 to the hot side of the steam preheat exchanger 15. From thence, a cooler first anode waste gas is carried via line 19 to the condenser 12, wherein at least a fraction of the water is condensed out. The condensed portion of liquid water is collected and passed via water pump 16 into water line 30. A second anode waste gas of reduced water content exits the condenser 12 via line 32 and is fed to the combustor 14.

In the combustor 14 the unconverted fuels ($H_2$+CO) in the second anode waste gas exhaust line 32 are burned with unconverted oxidant derived from the cathode waste gas exhaust line 22 to produce deep oxidation products, $H_2O$ and $CO_2$ respectively. These combustion products, exiting the combustor 14 via combustion product line 34, are fed into the turbomachine expander 36, from which an expanded combustion product is obtained in expanded combustion product line 38. The expanded combustion products are passed through the hot side of the heater 60 where heat is recuperated from the combustion products to heat the liquid water (or steam) passing through water/steam line 31, so as to produce a steam or superheated steam in steam line 52, which then passes into the reformer 18. Cool combustion products exit the heater 60 passing via combustion product line 39 into the hot side of the cathode air preheat exchanger 58, with even cooler combustion products exiting via line 64, which passes through the hot side of the fuel preheat exchanger 46, giving up more heat and eventually exhausting to the environment via exhaust line 66.

The condensed water in water line 30, obtained from condenser 12, is pumped through the cool side of the water preheat exchanger 15, where it is heated and passes as warmer water or steam in water/steam line 31 into the cool side of heater 60, where the water is further heated and vaporized (or steam is superheated) via heat transfer from the recuperated combustion products, resulting in the production of steam or superheated steam. Steam leaving the heater 60 via line 52 is fed into the steam reformer 18.

Figure 2:
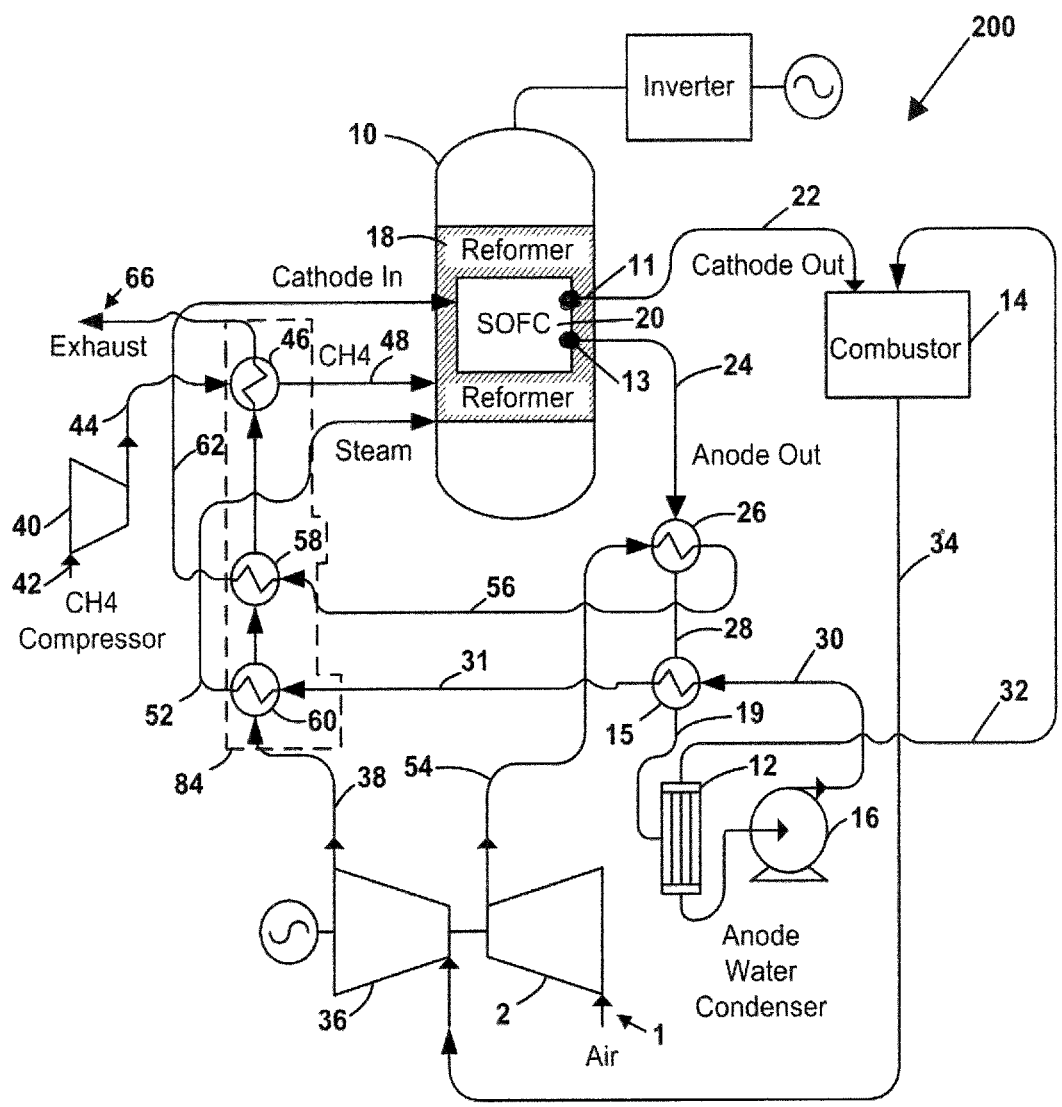
FIG. 2 depicts a schematic diagram of another embodiment of the integrated power generation system of this invention and its operating process.

FIG. 2 depicts another embodiment 200 of the thermally integrated power generation system of this invention, which is similar in all respects to the embodiment depicted in FIG. 1 with one exception. In FIG. 2, the heater 60, the cathode air preheat exchanger 58, and the reformer fuel heat exchanger 46 are all combined into a multi-line heat exchanger 84 encircled by dotted lines in FIG. 2. As such, the expanded combustion product line 38 passes into the hot side of the multi-line heat exchanger 84; while each of the water/steam line 31, the cathode air line 56, and the reformer fuel line 44 passes individually through the cool side of the multi-line heat exchanger 84.

Functionally, as implied from FIG. 2, thermal energy in the combustion products flowing in expanded combustion product line 38 converts water flowing directly from line 30 (or water and/or steam flowing in line 31) into steam, which steam is fed through steam line 52 to the reformer 18. Likewise, thermal energy in the combustion products flowing from expanded combustion product line 38 heats the oxidant (air) flowing from line 56, which then passes as heated oxidant (air) in line 62 into the cathode side 11 of the SOFC stack 20. Similarly, thermal energy in the combustion products passing from expanded combustion product line 38 heats the hydrocarbon fuel flowing from line 44, thereby sending heated fuel through line 48 into the reformer 18. Accordingly, as shown in FIG. 2, only one multi-line heat exchanger 84 is employed to raise the temperature of three inlet streams to operating temperatures. The skilled person will appreciate that in this embodiment, all three input streams 31, 56, and 44 experience the same high temperature from the expanded combustion product line 38; as opposed to the embodiment of FIG. 1 wherein the expanded combustion products are sequentially depleted in thermal energy and temperature as they pass through the three individual heat exchangers 60, 58, and 46, thereby presenting different temperatures to the input streams 31, 56, and 44. In the configuration of FIG. 2, the multi-line heat exchanger 84 provides for a higher heat transfer due to improved thermal gradients, while adding benefits of equalizing the cold stream temperatures of the fuel line 48, steam line 52 and cathode air line 62 as they enter the SOFC hotbox 10.

Figure 3:
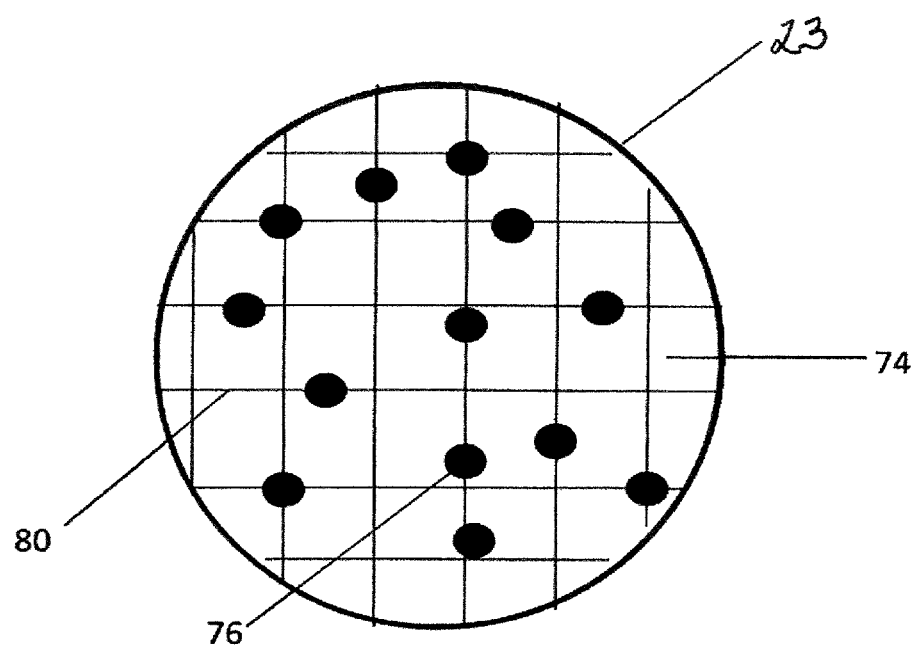
FIG. 3 illustrates in transverse view an embodiment of a steam reforming catalyst structure comprising a mesh substrate having a reforming catalyst supported thereon.

The steam reformer employed in this invention comprises any steam reformer as known and described in the art. Generally, the steam reformer comprises a fuel inlet, a steam inlet, and a catalytic reaction zone having disposed therein a substrate onto which a reforming catalyst is supported. Non-limiting examples of suitable substrates include powders, pellets, extrudates, foams, and meshes. In one advantageous embodiment, the substrate is porous, and preferably provided as a mesh constructed in the form of a reticulated net or screen comprising a plurality of pores, cells, or channels having an ultra-short-channel-length as defined hereinafter. FIG. 3 depicts in horizontal transverse view one such mesh substrate 23 comprising an array of struts 80 and a plurality of void volumes 74, the struts having supported thereon particles or a coating of catalyst 76. In one embodiment, the mesh is provided in a coiled configuration of cylindrical shape having an inner diameter and a larger outer diameter such that reactants flowing there through move along a radial flow path from an inlet along the inner diameter to an outlet along the outer diameter. In another embodiment, the mesh is provided as a stack of planar sheets with an inlet at one end of the stack and an outlet at an opposite end of the stack. In any configuration the bulk configuration of the mesh provides for a plurality of void volumes in random order, that is, empty spaces having essentially no regularity along the flow path from inlet to outlet. The mesh substrate is suitably constructed from a metal mesh, a ceramic mesh, or a combination thereof as in a cermet.

In more specific embodiments, the metal mesh substrate is constructed from any thermally conductive metal or alloy capable of withstanding the temperatures and chemical environment to which the substrate is exposed. Suitable non-limiting materials of construction include iron-chromium alloys, iron-chromium-aluminum alloys, and iron-chromium-nickel alloys. Such metal meshes are available commercially, for example, from Alpha Aesar and Petro Wire & Steel. In one exemplary embodiment, the metal mesh comprises a MICROLITH® brand metal mesh (Precision Combustion, Inc., of North Haven, Connecticut, USA). As described in U.S. Pat. Nos. 5,051,241 and 6,156,444, incorporated herein by reference, the MICROLITH® brand mesh technology offers a unique design combining an ultra-short-channel-length with low thermal mass in one monolith, which contrasts with prior art monoliths having substantially longer channel lengths as noted hereinafter.

With reference to a ceramic mesh substrate, the term "ceramic" refers to inorganic non-metallic solid materials with a prevalent covalent bond, including but not limited to metallic oxides, such as oxides of aluminum, silicon, magnesium, zirconium, titanium, niobium, and chromium, as well as zeolites and titanates. Reference is made to U.S. Pat. Nos. 6,328,936 and 7,141,092, detailing layers of ultra-short-channel-length ceramic mesh comprising woven silica, both patents incorporated herein by reference. With reference to a cermet substrate, the term "cermet" refers to a composite material comprising a ceramic in combination with a metal, the composite being typically conductive while also exhibiting a high resistance to temperature, corrosion, and abrasion in a manner similar to that of ceramic materials.

The mesh substrate is not limited by any method of manufacture; for example, meshes can be constructed via weaving or welding fibers, or by an expanded metal technique as disclosed in U.S. Pat. No. 6,156,444, incorporated herein by reference, or by 3-D printing, or by a lost polymer skeleton method.

In a preferred embodiment, the substrate employed in the steam reformer within the hotbox comprises the aforementioned MICROLITH® brand mesh of ultra-short-channel-length (Precision Combustion, Inc., North Haven, Connecticut, USA). Generally, the mesh comprises short channel length, low thermal mass metal monoliths, which contrast with prior art monoliths having longer channel lengths. For purposes of this invention, the term "ultra-short-channel-length" refers to a channel length in a range from about 25 microns (μm) (0.001 inch) to about 500 μm (0.02 inch). In contrast, the term "long channels" pertaining to prior art monoliths refers to channel lengths of greater than about 5 mm (0.20 inch) upwards of 127 mm (5 inches). In this invention the term "channel length" is taken as the distance along one pore or channel as measured from an inlet on one side of the mesh sheet to an outlet on another side of the mesh sheet. This measurement is not to be confused with the overall length of flow path through the entire substrate from an inlet at the inner diameter, for example, of the coiled mesh to an outlet at the outer diameter of the coiled mesh. In another embodiment, the length of the pore, cell, or channel is no longer than the diameter of the elements from which the mesh is constructed; thus, the channel length may range from 25 μm (0.001 inch) up to about 100 μm (0.004 inch). Generally, the channel length is no longer than about 350 μm (0.014 inch). In view of this ultra-short channel length, the contact time of reactants with the mesh and catalyst supported thereon advantageously ranges from about 5 milliseconds (5 msec) to about 350 msec. The MICROLITH® brand ultra-short-channel-length mesh typically comprises from about 100 to about 1,000 or more flow channels per square centimeter.

More specifically, each layer of mesh in this invention typically is configured with a plurality of channels or pores having a diameter ranging from about 0.25 millimeters (mm) to about 1.0 mm, with a void space greater than about 60 percent, preferably up to about 80 percent or more. A ratio of channel length to diameter is generally less than about 2:1, preferably less than about 1:1, and more preferably, less than about 0.5:1.

The MICROLITH® brand mesh having the ultra-short-channel-length facilitates packing more active surface area into a smaller volume and provides increased reactive area and lower pressure drop, as compared with prior art monolithic substrates. Whereas in prior art honeycomb monoliths having conventional long channels where a fully developed boundary layer is present over a considerable length of the channels; in contrast, the ultra-short-channel-length characteristic of the mesh substrate of this invention avoids boundary layer buildup. Since heat and mass transfer coefficients depend on boundary layer thickness, avoiding boundary layer buildup enhances transport properties. Employing the ultra-short-channel-length mesh, such as the MICROLITH® brand thereof, to control and limit the development of a boundary layer of a fluid passing there through is described in U.S. Pat. No. 7,504,047, which is a Continuation-In-Part of U.S. Pat. No. 6,746,657 to Castaldi, both patents incorporated herein by reference. The preferred MICROLITH® brand mesh of ultra-short-channel-length also advantageously provides for a light-weight portable size, a high throughput, thorough mixing of reactants passing there through, a high one-pass yield of hydrogen-containing reformate, a low yield of coke and coke precursors, and an acceptably long catalyst lifetime, as compared with alternative substrates, such as, ceramic monolith and pelleted substrates.

The substrate disposed within the reforming zone of the steam reformer supports a reforming catalyst, which under operating conditions functions to facilitate steam reforming or autothermal reforming, as desired. A suitable reforming catalyst comprises one or more metals of Group VIII of the Periodic Table of the Elements, including iron, cobalt, nickel, ruthenium, rhodium, palladium, osmium, iridium, platinum, and mixtures thereof. The catalyst chosen depends upon the particular fuel fed to the reformer. Gaseous fuels, such as methane, are suitably reformed with a nickel catalyst as known in the art. Liquid fuels, such as diesel, are suitably reformed with one or a mixture of platinum group metals (PGM, e.g., Ru, Rh, Pd, Os, Ir, Pt. and mixtures thereof). The deposition of catalytic metal(s) onto the metal mesh is implemented by methods well known in the art. Alternatively, finished catalysts comprising catalytic metal(s) supported on the MICROLITH® brand mesh substrate are available from Precision Combustion, Inc., North Haven, CT.

In another exemplary embodiment, the mesh is constructed of an analogous structure of metal, ceramic, or other manufactured or structured ultra-short-channel-length substrate material comprising an interconnected network of solid struts defining a plurality of pores of an open-cell configuration. In this embodiment, the pores have any shape or diameter; but typically, a number of pores that subtend one inch designate a "pore size," which for most purposes ranges from about 5 to about 80 pores per inch. The relative density of such structures, taken as the density of the structure divided by the density of solid parent material of the struts, typically ranges from about 2 to about 15 percent. Manufactured or structured ultra-short-channel-length substrates are commercially available in a variety of materials capable of withstanding the operating temperatures of the steam reformer and SOFC of this invention.

Under operating conditions the reformer is typically fed a hydrocarbon fuel comprising, for example, any gaseous hydrocarbon existing in a gaseous state at 22° C. and 1 atm pressure (101 kPa), or alternatively, any liquid hydrocarbon that is atomizable or vaporizable. Non-limiting examples of suitable gaseous hydrocarbons include methane, natural gas, ethane, propane, butane, biogas, and mixtures thereof. Non-limiting examples of suitable liquid hydrocarbons include hexane, octane, gasoline, kerosene, and diesel, biodiesels, jet propulsion fuels and synthetic fuels derived, for example, from Fisher-Tropsch processes, and mixtures thereof. Preferred fuels include methane and natural gas. The skilled person will appreciate that various embodiments of the system apparatus and flow architecture might differ depending upon the hydrocarbon fuel selected. A gaseous hydrocarbon fuel, for example, typically is compressed and preheated prior to entry into the fuel reformer, as seen in the embodiment illustrated in FIG. 1. A liquid hydrocarbon fuel typically is not compressed, nor is it heated by itself inasmuch as heating might result in coking. Rather, a liquid hydrocarbon fuel can be atomized and/or mixed with steam and afterwards preheated to an appropriate inlet temperature for the fuel reformer.

Besides the hydrocarbon fuel, steam and optionally an oxidant are fed to the reformer. If employed, the oxidant supplied to the reformer comprises a chemical capable of partially oxidizing the hydrocarbon fuel selectively to a gaseous reformate comprising hydrogen and carbon monoxide (syngas). Suitable oxidants include, without limitation, essentially pure molecular oxygen, mixtures of oxygen and nitrogen, such as air, and mixtures of oxygen and one or more inert gases, such as helium and argon.

During steam reforming, the quantities of steam and fuel supplied to the reformer are best described in terms of a steam to carbon ratio (St/C), which is defined as a ratio of number of moles of steam provided per atom of carbon provided in the hydrocarbon fuel. Generally, the St/C ratio is greater than about 2.5:1 and less than about 4.5:1. Typically, no oxidant is supplied during steam reforming; however, some oxidant may be supplied if desired. The quantities of hydrocarbon fuel and oxidant supplied during steam reforming are best described in terms of an O:C ratio, wherein "O" refers to atoms of oxygen in the oxidant and "C" refers to atoms of carbon in the fuel. Generally, the O:C ratio of oxidant to fuel fed under steam reforming conditions ranges from 0:1 to about 0.5:1.

The steam reformer operates at a temperature greater than about 500° C. and less than about 1,100° C. A suitable weight hourly space velocity measured at 21° C. and 1 atm (101 kPa) ranges from about 100 liters of combined flow of hydrocarbon fuel, steam, and oxidant per hour per gram catalyst (100 L/hr-g-cat) to about 6,000 L/hr-g-cat, which allows for high throughput. The corresponding gas hourly space velocity measured at 21° C. and 1 atm (101 kPa) ranges from about 1,500 liters of combined flow of hydrocarbon fuel, steam, and oxidant per hour per liter catalyst (1,500 hr$^{-1}$) to about 100,000 hr$^{-1}$. A reforming efficiency of greater than about 75 percent and, preferably, greater than about 80 percent is achievable relative to the LHV (lower heating value) of the hydrocarbon fuel fed to the reformer. The reformer is capable of operating for greater than about 1,000 hours without indications of coke production and catalyst deactivation.

Within the hotbox the steam reformer is disposed in close proximity, but spaced-apart in relationship to the solid oxide fuel cell stack(s). This disposition allows convective and radiative heat from the stack(s) to be utilized to preheat the hydrocarbon fuel and the steam being fed to the steam reformer. One embodiment of a hotbox design integrating the steam reformer and the SOFC stack(s) is found in U.S. Pat. No. 10,411,281, issued Sep. 10, 2019, incorporated herein by reference.

Each SOFC fuel cell stack as required of this invention comprises a plurality of individual solid oxide fuel cell repeat units. Each fuel cell repeat unit comprises a sandwich assembly having constituent parts in the following order: a fuel electrode (anode), a solid oxide electrolyte, and an oxygen electrode (cathode), the fuel and oxygen electrodes being connected via an external electrical circuit. Each stack further includes interconnects that connect the fuel electrodes and oxygen electrodes in adjacent fuel cell repeat units, thereby collecting the current from each repeat unit and delivering the collected currents to the external circuit. The stack also includes bipolar plates, which separate the individual fuel cell repeat units from each other as well as flow manifolds that deliver and distribute the flows of stack fuel and oxygen to their respective electrodes within the stack and remove products from the stack.

The art describes many embodiments of solid oxide fuel cell repeat units, any of which is suitably employed in this invention. As a non-limiting exemplary embodiment, the solid oxide electrolyte comprises a ceramic that is a good conductor of oxide ions but a poor or nonconductor of electrons, which ensures that the electrons pass through the external circuit. As a non-limiting exemplary embodiment, the solid oxide electrolyte is constructed of a ceramic comprising a yttria-stabilized zirconia (YSZ) sandwiched in between a fuel electrode comprised of a nickel oxide/YSZ cermet and an oxygen electrode comprised of a doped lanthanum manganite. This is only one suitable design that should not limit the invention in any manner.

The solid oxide fuel cell is an apparatus that in forward operation provides for the electrochemical reaction of a stack fuel, namely hydrogen or carbon monoxide, with an oxidant, such air or oxygen, to produce a DC electrical current and a chemical product, namely, water or carbon dioxide, respectively. The stack fuel is fed to the fuel electrode where it reacts via oxidation with oxide ions to produce the oxidized chemical product, i.e., the water and/or carbon dioxide, and a flow of electrons. In another embodiment, the stack fuel additionally comprises methane. Depending on the internal reforming capability of the stack, the methane reacts with water in the stack fuel, or that produced from electrochemical reaction within the stack, to produce additional stack fuel comprising hydrogen and carbon monoxide. The electrons produced travel via an embedded current collector and the external electrical circuit to the oxygen electrode, where molecular oxygen is reduced to form oxide ions. During transit the electrons are available to do useful work. The oxide ions produced at the oxygen electrode diffuse through the solid oxide electrolyte to the fuel electrode to complete the chemical reaction.

A cathode waste gas stream (i.e., oxidant electrode waste gas) comprising unreacted oxidant exits each SOFC stack at the cathode. Likewise, an anode waste gas stream (i.e., first anode waste gas stream comprising the fuel electrode tail gas or fuel electrode waste gas) exits each SOFC stack at the anode. The anode waste gas stream comprises, in addition to water and carbon dioxide, any unreacted hydrogen and carbon monoxide. In this invention, the anode waste gas stream is fed into a condenser to remove at least a fraction of the water therefrom, such fraction constituting at least one-half (½) of the total water content, and preferably, from greater than ½ to essentially all of the water content. The skilled person will appreciate that any known condenser apparatus configured to cool the stream passing therethrough and remove (condense) any water therefrom is suitably employed herein. A second anode waste gas stream of higher fuel energy density and reduced water content exits the condenser.

Thermally integrated power generation systems of the prior art typically employ two combustors: one combustor to burn fuel to drive the turbomachine and another combustor to generate heat and steam to drive the steam reformer. Often in the prior art, the steam reformer is intimately associated with one or the combustors, for example, in a tube-in-shell design. In contrast, this invention requires only one combustor, as seen in FIG. 1 (14), whose disposition in the power generation system provides for dual functionality, simultaneously driving the turbomachine while providing the heat and steam needed for the steam reformer. Moreover, in this invention the steam reformer need not have an overly-complicated design incorporating its own combustor.

The combustor of this invention receives the second anode waste gas stream and at least a portion of the cathode waste gas stream. Generally, the portion of cathode waste gas stream sent to the combustor is sufficient to oxidize all of the unreacted fuel remaining in the second anode waste gas stream completely to carbon dioxide and water. It should be appreciated that the combustor is therefore operated at a stoichiometric ratio of fuel to oxidant or operated at a fuel lean ratio, as desired.

The combustor itself is generically provided by any conventional flame-stabilized or flameless, catalytic or non-catalytic combustor design as known in the art. The combustor comprises a housing defining a combustion zone or chamber, an oxidant inlet, a fuel inlet, and an outlet for exiting combustion products. The combustor typically may include an ignition device, such as a spark igniter or glow plug. The chamber itself, the inlets and outlet are conventionally constructed from any material of suitable durability in view of the temperature and chemicals to which the combustor is exposed. Suitable non-limiting materials of construction for the combustor include, for example, nickel-chromium alloys and nickel-chromium-iron alloys, such as INCONEL®, HASTELLOY®, and HAYNES® brands of alloys. These alloys are appropriately passivated to prevent contamination of components from off-gassing. In one embodiment, an interior chamber of the combustor is filled with a combustion catalyst, such as a platinum group metal (PGM) provided in the form of powder, pellets, extrudates, or the like.

In one exemplary embodiment, the combustor comprises a mesh substrate, for example, a metallic mesh substrate, and more preferably, the MICROLITH® brand metal mesh substrate described in detail hereinbefore. With an appropriate combustion catalyst supported thereon, the combustor operates as a flameless, catalytic combustor. Under operating conditions, the combustor is fed the cathode waste gas providing an oxidant and the second anode waste gas comprising unreacted hydrogen, unreacted carbon monoxide, carbon dioxide and a reduced water content. The combustor is operated under stoichiometric or preferably "fuel-lean" conditions, namely, at an O:C ratio equal to or exceeding a ratio required to convert all carbon monoxide and hydrogen in the fuel to carbon dioxide and water.

The turbomachine employed in this invention comprises any conventional combination of a compressor and an expander. The compressor functions to compress air for the solid oxide fuel cell. The expander expands the heated combustion product thereby converting heat to mechanical energy and thence, if desired, via a generator into electricity. A person skilled in the art will know the many suitable designs available for the turbomachine.

The expanded combustion products pass into a heater, which in one embodiment functions as a boiler converting water to steam and in another embodiment functions as a steam superheater converting steam to a hotter steam. The heater is constructed as a conventional heat exchanger, wherein heat in the combustion products is transferred across a common thermally conductive wall to the water or steam cycling from the condenser. In this way, steam or superheated steam is made available for the steam reformer. In one embodiment, the process is net neutral in water. In another embodiment, the process is net positive in water, meaning that the total water produced in the combined SOFC-combustor exceeds a quantity of water needed to operate the steam reformer.

The thermally integrated power generation system of this invention allows for a flexible variety of heat exchanger configurations. With reference to FIG. 1, heater 60 is essential as it utilizes heat from the expanded combustion stream 38 to convert water (or steam) in water line 31 (or water in line 30 if preheater 15 is not used) into steam (or superheated stream) for the steam reformer 18. Optionally, additional heat exchangers can be employed in this invention. For example, in one embodiment heat from the combustion products is further employed to preheat oxidant (air) for the cathode side of the SOFC, as seen in the cathode air preheat exchanger of FIG. 1 (58). In another embodiment, heat from the combustion products is further employed to preheat the hydrocarbon fuel for the reformer as seen in fuel preheat exchanger FIG. 1 (46). In another embodiment, as seen in FIG. 2, preheat exchangers 60, 58, and 46 are combined into one multi-line heater 84. In yet another embodiment, the first anode waste gas in line 24 is also utilized to preheat the oxidant for the cathode, as seen in cathode air preheat exchanger of FIG. 1 (26). In yet another embodiment, the first anode waste gas in line 28 is utilized to preheat the water for the steam reformer, as seen in the water preheat exchanger of FIG. 1 (15). Any of the heat exchangers employed are conventional in design, functioning to recuperate heat from one stream, for example, the combustion product stream, for use in heating another stream, for example, the water stream. In terms of structure, the heat exchangers, any housing associated therewith, and hot and cold side pathways are constructed from any materials suitably adapted for the temperatures to which the relevant structures will be exposed. Inlet and outlet connectors for transporting the combustion stream, the water or steam streams, the cathode air stream and the anode fuel stream into and out of the heat exchanger pathways are conventional in design.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

INDEX FOR FIGURES

1. Air Line (Oxidant Line)
2. Turbomachine Compressor
10. Hot Box
12. Condenser
11. Cathode (Oxidant) Electrode of SOFC
13. Anode (Fuel) Electrode of SOFC
14. Combustor
15. Water Preheat Exchanger
16. Water Pump
18. Steam Reformer
19. Cooler First Anode Waste Gas Line
20. Solid Oxide Fuel Cell Stack
22. Cathode Waste Gas Exhaust Line
23. Mesh Substrate
24. First Anode Waste Gas Exhaust Line
26. Air Preheat Exchanger
28. Cool First Anode Waste Gas Line
30. Water Line
31. Water/Steam Line
32. Second Anode Waste Gas Line
34. Combustion Product Line
36. Turbomachine Expander
38. Expanded Combustion Product Line
39. Cool Expanded Combustion Product Line
40. Fuel Compressor
42. Hydrocarbon Fuel Line to Compressor
44. Compressed Hydrocarbon Fuel Line
46. Hydrocarbon Fuel Preheat Exchanger
48. Heated Compressed Fuel Line to Reformer
52. Steam or Superheated Steam Line to Reformer
54. Compressed Air (Oxidant) Line
56. Preheated Compressed Air (Oxidant) Line
58. Cathode Air Preheat Exchanger
60. Heater
62. Preheated Cathode Air (Preheated Oxidant) Line to SOFC
64. Cooler Expanded Combustion Product Line
66. Combustion Product Exhaust Line to Environment
74. Mesh Substrate Channels, Pores, or Void Volumes
76. Reforming Catalyst
80. Struts of Mesh Substrate
84. Multi-Line Heater (Multi-Line Heat Exchanger)

The invention claimed is:

1. An integrated power generation system comprising:

(a) a solid oxide fuel cell hotbox comprising a steam reformer configured to produce under reforming conditions a stack fuel, and further comprising at least one solid oxide fuel cell stack configured to convert the stack fuel into a first anode waste gas comprising water;
(b) a condenser configured to receive the first anode waste gas and condense at least a fraction of the water therefrom, so as to produce a second anode waste gas of reduced water content;
(c) a combustor configured to receive from the condenser the second anode waste gas of reduced water content and further configured to combust the same to form a combustion product, wherein the combustor comprises a mesh substrate having a combustion catalyst supported thereon, wherein the mesh substrate has a channel length ranging from 25 microns to 500 microns and has from 100 to 1,000 channels per square centimeter;
(d) a turbomachine comprising an expander configured to expand the combustion product and pass said expanded combustion product to an expanded combustion product line;
(e) a heater comprising a cold side pathway and a hot side pathway, the cold and hot side pathways being in thermally conductive contact; the heater configured to receive into the cold side pathway the water from the condenser, and further configured to receive into the hot side pathway said expanded combustion product; and
(f) a steam line in fluid communication with both the cold side pathway of the heater and with the steam reformer.

2. The power generation system of claim 1 wherein the steam reformer comprises a substrate comprising a mesh having a reforming catalyst supported thereon, wherein the mesh has a channel length ranging from 25 microns to 500 microns and has from 100 to 1,000 channels per square centimeter.

3. The power generation system of claim 1 wherein the steam reformer comprises a substrate comprising a structured material having from 5 to 80 pores per inch and a relative density ranging from 2 to 15 percent.

4. The power generation system of claim 1, wherein the at least one solid oxide fuel cell stack comprises a plurality of solid oxide fuel cell repeat units, each repeat unit comprising in a sandwich configuration: a fuel electrode, a solid oxide electrolyte, and an oxidant electrode.

5. The power generation system of claim 1, further comprising a cathode air preheat exchanger configured such that a hot side of the cathode air preheat exchanger is fluidly connected to the expanded combustion product line, and a cold side of the cathode air preheat exchanger is fluidly connected to a cathode air line.

6. The power generation system of claim 1, further comprising a fuel preheat exchanger configured such that a hot side of the fuel preheat exchanger is fluidly connected to the expanded combustion product line, and a cold side of the fuel preheat exchanger is fluidly connected to a reformer fuel line.

7. The power generation system of claim 1, further comprising a multi-line heater, wherein a hot side of said multi-line heater is fluidly connected to the expanded combustion product line, and wherein a cold side of said multi-line heater is fluidly connected individually each to a water or steam line, a reformer fuel line, and a cathode air line.

8. The power generation system of claim 1, further comprising a water preheat exchanger configured to pass the first anode waste gas into a hot side of said water preheat exchanger and further configured to pass water collected from the condenser into a cold side of said water preheat exchanger.

9. The power generation system of claim 1, further comprising an air preheat exchanger configured to pass the first anode waste gas into a hot side of said air preheat exchanger and further configured to pass air into a cold side of said air preheat exchanger.

10. A process of operating an integrated power generation system, the power generation system comprising: (a) a solid oxide fuel cell hotbox comprising a steam reformer configured to produce under reforming conditions a stack fuel, and further comprising at least one solid oxide fuel cell stack configured to convert the stack fuel into a first anode waste gas comprising water; (b) a condenser configure to receive the first anode waste gas and condense at least a fraction of the water therefrom, so as to produce a second anode waste gas of reduced water content; a combustor configured to receive from the condenser the second anode waste gas of reduced water content and further configured to combust the same to form a combustion product; (d) a turbomachine comprising an expander configured to expand the combustion product and pass said expanded combustion product to an expanded combustion product line; a heater comprising a cold side pathway and a hot side pathway, the cold and hot side pathways being in thermally conductive contact the heater configured to receive into the cold side pathway the water from the condenser, and further configured to receive into the hot side pathway said expanded combustion product; and (f) a steam line in fluid communication with both the cold side pathway of the heater and with the fuel reformer, wherein the power generation system further comprises at least one of: (1) the combustor comprises a mesh substrate having a combustion catalyst supported thereon, wherein the mesh substrate has a channel length ranging from 25 microns to 500 microns and has from 100 to 1,000 channels per square centimeter; (2) a fuel preheat exchanger configured such that a hot side of the fuel preheat exchanger is fluidly connected to the expanded combustion product line, and a cold side of the fuel preheat exchanger is fluidly connected to a reformer fuel line (3) a multi-line heater, wherein a hot side of said multi-line heater is fluidly connected to the expanded combustion product line, and wherein a cold side of said multi-line heater is fluidly connected individually each to a water or steam line, the reformer fuel line, and a cathode air line; (4) a water preheat exchanger configured to pass the first anode waste gas into a hot side of said water preheat exchanger and further configured to pass water collected from the condenser into a cold side of said water preheat exchanger; and (5) an air preheat exchanger configured to pass the first anode waste gas into a hot side of said air preheat exchanger and further configured to pass air into a cold side of said air preheat exchanger, the method comprising: (i) in the steam reformer, contacting a hydrocarbon fuel and a steam in a catalytic reforming zone under process conditions sufficient to produce the stack fuel comprising hydrogen and carbon monoxide; (ii) feeding the stack fuel into a anode side of the at least one solid oxide fuel cell stack and feeding an oxidant into a cathode side of the solid oxide fuel cell stack under conditions sufficient to produce the first anode waste gas and a cathode waste gas; (iii) feeding the first anode waste gas into the condenser to remove at least a fraction of the water therefrom, so as to produce a water stream and the second anode waste gas of reduced water content; (iv) feeding the second anode waste gas of reduced water content and at least a portion of the cathode waste gas into the combustor under process conditions such that combustion occurs to produce the combustion product; (v) feeding the combustion product into the turbomachine expander so as to produce the expanded combustion product; (vi) feeding the expanded combustion product into the hot side pathway of the heater and feeding the water collected from the condenser into the cold side pathway of the heater so as to produce steam; (vii) feeding the steam so produced into the steam reformer.

11. The process of claim 10 wherein the catalytic reforming zone comprises a substrate comprising a mesh having a reforming catalyst supported thereon, wherein the mesh has a channel length ranging from 25 microns to 500 microns and has from 100 to 1,000 channels per square centimeter.

12. The process of claim 10 wherein the catalytic reforming zone comprises a substrate comprising a structured material having from 5 to 80 pores per inch and a relative density ranging from 2 to 15 percent.

13. The process of claim 10, wherein the at least one solid oxide fuel cell stack comprises a plurality of solid oxide fuel cell repeat units, each repeat unit comprising in a sandwich configuration: a fuel electrode, a solid oxide electrolyte, and an oxidant electrode.

14. The process of claim 10, wherein prior to step (iii) the first anode waste gas comprising the water is passed through the hot side of the air preheat exchanger so as to transfer heat to the air passing through the cold side of the air preheat exchanger.

15. The process of claim 10, wherein prior to step (iii) the first anode waste gas comprising the water is passed through the hot side of the water preheat exchanger so as to transfer heat to the fraction of the water obtained from the condenser being passed through the cold side of the water preheat exchanger.

16. The process of claim 10, wherein after step (vi) the expanded combustion product stream exiting the heater is passed into a hot side of a cathode air heat exchanger, so as to preheat the cathode air prior to entering the cathode side of the solid oxide fuel cell stack.

17. The process of claim 10, wherein after step (vi) the expanded combustion product stream exiting the heater is passed into the hot side of the fuel preheat exchanger so as to transmit heat to a reformer fuel prior to entering the steam reformer.

18. The process of claim 10, wherein the heater of step (vi) comprises the multi-line heater, such that the expanded combustion product stream is passed through the hot side of the multi-line heater, and streams of the water, the air, and the reformer fuel are passed individually into the cold side of the multi-line heater.

19. An integrated power generation system comprising:
(a) a solid oxide fuel cell hotbox comprising a steam reformer configured to produce under reforming conditions a stack fuel, and further comprising at least one solid oxide fuel cell stack configured to convert the stack fuel into a first anode waste gas comprising water;
(b) a condenser configured to receive the first anode waste gas and condense at least a fraction of the water therefrom, so as to produce a second anode waste gas of reduced water content;
(c) a combustor configured to receive from the condenser the second anode waste gas of reduced water content and further configured to combust the same to form a combustion product;
(d) a turbomachine comprising an expander configured to expand the combustion product and pass said expanded combustion product to an expanded combustion product line;
(e) a heater comprising a cold side pathway and a hot side pathway, the cold and hot side pathways being in thermally conductive contact; the heater configured to receive into the cold side pathway the water from the condenser, and further configured to receive into the hot side pathway said expanded combustion product;
(f) a steam line in fluid communication with both the cold side pathway of the heater and with the steam reformer; and
(g) a fuel preheat exchanger configured such that a hot side of the fuel preheat exchanger is fluidly connected to the expanded combustion product line, and a cold side of the fuel preheat exchanger is fluidly connected to a reformer fuel line.

20. An integrated power generation system comprising:
(a) a solid oxide fuel cell hotbox comprising a steam reformer configured to produce under reforming conditions a stack fuel, and further comprising at least one solid oxide fuel cell stack configured to convert the stack fuel into a first anode waste gas comprising water;
(b) a condenser configured to receive the first anode waste gas and condense at least a fraction of the water therefrom, so as to produce a second anode waste gas of reduced water content;
(c) a combustor configured to receive from the condenser the second anode waste gas of reduced water content and further configured to combust the same to form a combustion product;
(d) a turbomachine comprising an expander configured to expand the combustion product and pass said expanded combustion product to an expanded combustion product line;
(e) a heater comprising a cold side pathway and a hot side pathway, the cold and hot side pathways being in thermally conductive contact; the heater configured to receive into the cold side pathway the water from the condenser, and further configured to receive into the hot side pathway said expanded combustion product;
(f) a steam line in fluid communication with both the cold side pathway of the heater and with the steam reformer; and
(g) a multi-line heater, wherein a hot side of said multi-line heater is fluidly connected to the expanded combustion product line, and wherein a cold side of said multi-line heater is fluidly connected individually each to a water or steam line, a reformer fuel line, and a cathode air line.

21. An integrated power generation system comprising:
(a) a solid oxide fuel cell hotbox comprising a steam reformer configured to produce under reforming conditions a stack fuel, and further comprising at least one solid oxide fuel cell stack configured to convert the stack fuel into a first anode waste gas comprising water;
(b) a condenser configured to receive the first anode waste gas and condense at least a fraction of the water therefrom, so as to produce a second anode waste gas of reduced water content;
(c) a combustor configured to receive from the condenser the second anode waste gas of reduced water content and further configured to combust the same to form a combustion product;
(d) a turbomachine comprising an expander configured to expand the combustion product and pass said expanded combustion product to an expanded combustion product line;
(e) a heater comprising a cold side pathway and a hot side pathway, the cold and hot side pathways being in thermally conductive contact; the heater configured to receive into the cold side pathway the water from the condenser, and further configured to receive into the hot side pathway said expanded combustion product;

(f) a steam line in fluid communication with both the cold side pathway of the heater and with the steam reformer; and (g) a water preheat exchanger configured to pass the first anode waste gas into a hot side of said water preheat exchanger and further configured to pass water collected from the condenser into a cold side of said water preheat exchanger.

22. An integrated power generation system comprising:

(a) a solid oxide fuel cell hotbox comprising a steam reformer configured to produce under reforming conditions a stack fuel, and further comprising at least one solid oxide fuel cell stack configured to convert the stack fuel into a first anode waste gas comprising water;

(b) a condenser configured to receive the first anode waste gas and condense at least a fraction of the water therefrom, so as to produce a second anode waste gas of reduced water content;

(c) a combustor configured to receive from the condenser the second anode waste gas of reduced water content and further configured to combust the same to form a combustion product;

(d) a turbomachine comprising an expander configured to expand the combustion product and pass said expanded combustion product to an expanded combustion product line;

(e) a heater comprising a cold side pathway and a hot side pathway, the cold and hot side pathways being in thermally conductive contact; the heater configured to receive into the cold side pathway the water from the condenser, and further configured to receive into the hot side pathway said expanded combustion product;

(f) a steam line in fluid communication with both the cold side pathway of the heater and with the steam reformer; and (g) an air preheat exchanger configured to pass the first anode waste gas into a hot side of said air preheat exchanger and further configured to pass air into a cold side of said air preheat exchanger.

* * * * *